Patented Apr. 24, 1928.

1,667,491

UNITED STATES PATENT OFFICE.

WILLIAM C. PIVER, OF HILLSIDE, NEW JERSEY.

METHOD OF MAKING COMMERCIAL CALCIUM ARSENATE.

No Drawing. Application filed July 5, 1924. Serial No. 724,512.

This invention relates to a process for making commercial calcium arsenate in a dry powdered form direct from stone lime, which is the ordinary calcium oxide of commerce, eliminating the handling of large quantities of water or different solutions in numerous tanks and the use of drying apparatus, with the large outlay for equipment which is necessary for producing calcium arsenate by the "wet processes" now in general use. In its broad features, this invention is similar to that described in my co-pending application, Ser. No. 687,134.

Calcium arsenate is extensively used as an insecticide for the control of insect pests on many kinds of foliage. The commercial calcium arsenates which are sold on the market consist of about 70% calcium arsenate and about 30%, more or less, of other compounds, largely hydrated lime.

To meet Government requirements, the calcium arsenate must contain not less than 40% arsenic pentoxide and not over 1% arsenic in water soluble form. An effective insecticide for insect control should also be an impalpable powder having maximum covering power and great adhesiveness.

The usual commercial method for producing calcium arsenate is to treat milk of lime with arsenic acid. This, of course, requires a great deal of expensive equipment and the handling of large volumes of water, as the reacting solutions are more or less dilute, with the subsequent drying of the precipitate or sludge, all of which is a long drawn out and costly procedure.

Stone lime is an energetic base and is easily hydrated when brought into contact with water. It would seem, therefore, without investigation, that the addition of arsenic acid (which is a water solution of arsenic pentoxide) to stone lime would cause hydration of the lime and the formation of calcium arsenate suitable for insecticidal purposes. However, under ordinary conditions, such is not the case, for if arsenic acid is added to stone lime, heat is generated, partial hydration of the lime takes place, the lump only falling apart to a small extent and an outside hard coating of acid calcium arsenate is formed. The lime is not penetrated by the acid and calcium arsenate formed is a mixture of the mono and di-acid variety, which is water soluble to a large extent and the product has little or no value as an insecticide, due to its incorrect chemical composition and its physical characteristics. The formation of the acid or soluble salts when arsenic acid is added to stone lime, even though the lime be present in excess, is due to the fact that not enough surface of the lime being treated is available to the acid.

My investigations also indicate that the acid calcium arsenate is always formed when arsenic acid is first added to milk of lime, even when there is an excess of calcium hydroxide present. However, as the acid is further added to the milk of lime the calcium arsenate first formed is finally converted into the normal salts, where an excess of lime is present, under certain conditions.

As the same thing seems to happen when arsenic acid is added directly to unslacked lime it would indicate that if the lump lime could be treated so that the solution of the arsenic acid would penetrate the particles of which the stone lime is composed and come into contact with a large surface area, the desired reaction might be obtained, and while the acid or soluble salts might be formed first, the large excess of calcium oxide always present would almost immediately convert the acid salts into normal salts of little water solubility and a product of good physical quality result.

The arsenic acid used today for producing calcium arsenate contains an average of 60 to 65 units of arsenic pentoxide per pound. It has an average specific gravity of about 1.850 and is known as concentrated acid. Acid of this concentration sprayed or poured on stone lime produces a compound having no value as an insecticide. If the lump lime, however, is first made porous to a certain extent or disintegrated by partly hydrating the lump, dilute or concentrated acid can be brought into contact with this lime so treated and tri-calcium ortho arsenate of a very fine quality is produced.

My method of producing a commercial calcium arsenate in a dry powdered form directly from stone lime has been evolved from the results of my investigations and experiments, heretofore outlined, and, as an example of my process or method, I proceed as follows:—

To 100 parts of stone lime, placed in a mixing apparatus, either of the horizontal or vertically closed type, I introduce 8 to 10 parts of water, preferably in the form of steam or spray. Much heat is generated and the stone lime lumps begin to disintegrate or fall apart, with the evolution of considerable steam. The escape of the steam or moisture is controlled so that the breaking up of the lime is accomplished with as little water as is possible, less than is required for the complete hydration. After a short interval the lump lime will be found to have broken down or distintegrated into a fine powder and some small lumps. The agitator or stirrer of the mixer is now started and a further reduction of the lumps of lime occurs as these lumps are exposed to the steam by the action of the agitator.

The disintegration of the stone lime by this method of treatment into a form easily acted upon by the arsenic acid requires only a few moments. Arsenic acid (of about 60% arsenic pentoxide) solution is now gradually (preferably) added to the treated lime, 144 parts of this percentage acid being required to produce a calcium arsenate analyzing about 42% arsenic pentoxide with little or no soluble arsenic.

The acid may be added quickly or gradually sprayed on the treated lime, provided the lime is always sufficiently in excess to remove all of the free water, but, as much heat is generated as the acid comes into contact with the lime, it is preferable to add the arsenic acid slowly, preferably by spraying into the apparatus, in order to prevent violent reaction and the production of high temperatures, which may reach as high as 200° C. unless the sprayed acid is carefully controlled.

In this way, a very finely powdered tri-calcium ortho arsenate, analyzing well over the Government requirements, is produced. The process is simple, economical and inexpensive, in that large quantities of a commercial calcium arsenate having valuable insecticidal properties can be manufactured in practically one operation, the treatment of the stone lime with a small amount of water and the treating with arsenic acid taking place in the same apparatus. By my method, preliminary or outside separate treatment of the stone lime is eliminated, thereby reducing the cost of equipment and extra labor required for separate treatment or operations.

I do not wish to confine myself to any particular strength of the arsenic acid, as this depends on the arsenic pentoxide units required in the finished product. A concentrated acid creates or generates, when brought into contact with the lime, a higher temperature than does a weaker acid, thereby eliminating a larger percentage of water. Neither do I desire to confine myself to any specified amount of water to be used in partially hydrating the lump lime, as the quantity of water may be varied, depending upon whether strong or dilute acid is used. The stronger acid produces calcium arsenate of high arsenic pentoxide content with the minimum amount of water used for hydration and a weaker acid with the maximum amount of water used for hydration produces calcium arsenate with a low arsenic pentoxide content.

I have not attempted to determine just what chemical reaction takes place when the lumps of stone lime are treated with an amount of water insufficient to cause a complete hydration thereof, as herein described, and this does not seem to be well understood. It may be that a partially hydrated calcium compound is produced or a mixture of calcium oxide and calcium hydrate is formed. The important fact which I have determined is that the lumps of stone lime are disintegrated by this treatment and a product is formed which is very readily acted upon by the solution of arsenic acid and produces a calcium arsenate in dry powdered form which has a higher content of insoluble arsenic pentoxide and a smaller content of soluble arsenic than any of the products which it is possible to produce by the ordinary methods.

The product produced by this method, having these properties, forms a very fine grade of commercial calcium arsenate suitable for use as an insecticide and meeting all Government requirements.

What I claim is:—

1. The method of manufacturing commercial calcium arsenate in a dry powdered form, comprising first treating commercial calcium oxide with less water than is required for its complete hydration while agitating the material, and then the addition of arsenic acid thereto, the calcium oxide being always sufficiently in excess to remove all of the free water and to produce calcium arsenate in a dry powdered form.

2. The method of manufacturing commercial calcium arsenate in a dry powdered form, comprising first disintegrating stone lime by treatment with a small amount of water, the amount of water being less than one-third, by weight, than the amount of lime, agitating the compound during this treatment, and then reacting this compound with arsenic acid solution, the lime being always sufficiently in excess to remove all of the free water and to produce calcium arsenate in a dry powdered form.

3. The method of manufacturing commercial calcium arsenate in a dry powdered form, comprising the hydration of calcium oxide to a predetermined degree of hydration, less than complete hydration, while agitating the compound, and then the addition of arsenic acid solution thereto, the calcium oxide being always sufficiently in excess to remove all of the free water and to produce a commercial calcium arsenate of low solubility.

4. The method of manufacturing commercial calcium arsenate in dry powdered form, comprising first the hydration of calcium oxide with sufficient water only to disintegrate the same during agitation of this compound, and then the addition of arsenic acid solution thereto. the calcium oxide being always sufficiently in excess to remove all of the free water therefrom and to produce a commercial calcium arsenate in a dry powdered form.

5. The method of producing commercial calcium arsenate in dry powdered form direct from stone lime by treating the lime with a small amount of water sufficient only to disintegrate the lime, while agitating the lime particles, and then adding sufficient arsenic acid solution thereto to produce a dry powdered form of commercial calcium arsenate, the lime being sufficiently in excess during the treatment to take up all of the free water.

6. The process of making arsenate of lime which comprises treating quick lime and hydrated lime with arsenic acid in a highly concentrated condition.

7. The process of making arsenate of lime which comprises treating a mixture of quick lime and hydrated lime with a solution of arsenic acid.

Signed at New York in the county of New York and State of New York this 2nd day of July A. D. 1924.

WILLIAM C. PIVER.